United States Patent [19]
Matsen et al.

[11] Patent Number: 5,847,375
[45] Date of Patent: Dec. 8, 1998

[54] FASTENERLESS BONDER WINGBOX

[75] Inventors: Marc R. Matsen, Seattle; Douglas A. McCarville, Auburn; Michael M. Stepan, Langley, all of Wash.

[73] Assignee: The Boeing Company, Seattle, Wash.

[21] Appl. No.: 685,059

[22] Filed: Jul. 19, 1996

Related U.S. Application Data

[60] Division of Ser. No. 470,168, Jun. 6, 1995, which is a continuation-in-part of Ser. No. 341,779, Nov. 18, 1994, Pat. No. 5,599,472, which is a continuation-in-part of Ser. No. 169,655, Dec. 16, 1993, Pat. No. 5,530,227, which is a continuation-in-part of Ser. No. 777,739, Oct. 15, 1991, Pat. No. 5,410,132, said Ser. No. 341,779, is a continuation-in-part of Ser. No. 92,050, Jul. 15, 1993, Pat. No. 5,410,133, which is a division of Ser. No. 681,004, Apr. 5, 1991, Pat. No. 5,229,562, which is a continuation-in-part of Ser. No. 151,433, Nov. 12, 1993, Pat. No. 5,420,400.

[51] Int. Cl.$^6$ ........................................ H05B 6/10
[52] U.S. Cl. ................. 219/635; 219/633; 219/645; 219/615; 156/64; 244/120; 228/157
[58] Field of Search .................... 219/602, 603, 219/615, 617, 618, 633, 634, 635; 156/64; 244/119, 120, 130–133; 228/157

[56] References Cited

U.S. PATENT DOCUMENTS

| | | |
|---|---|---|
| 2,241,312 | 5/1941 | Lutty . |
| 2,273,423 | 2/1942 | Somes . |
| 2,273,609 | 2/1942 | Wrighton . |
| 2,372,920 | 4/1945 | Blessing . |
| 2,378,801 | 6/1945 | Sidell et al. . |
| 2,379,829 | 3/1945 | Pedlow et al. . |
| 2,423,922 | 7/1947 | Arndt, Jr. . |
| 2,589,777 | 3/1952 | Collins . |
| 2,715,598 | 8/1955 | Rees . |
| 2,761,941 | 9/1956 | Ardichvili . |

(List continued on next page.)

FOREIGN PATENT DOCUMENTS

| | | |
|---|---|---|
| 452317 | 10/1943 | Belgium . |
| 0529917 | 3/1993 | European Pat. Off. . |
| 0 461 979 | 4/1994 | European Pat. Off. . |
| 585195 | 2/1925 | France . |
| 2591681 | 6/1987 | France . |
| 17-56-444 | 4/1970 | Germany . |
| 54-25542 | 2/1979 | Japan . |
| 05/286496 | 11/1993 | Japan . |
| 5-286496 | 11/1993 | Japan . |
| 1315373 | 5/1973 | United Kingdom . |
| 1418327 | 12/1975 | United Kingdom . |
| 2168643 | 6/1986 | United Kingdom . |
| WO 93/19926 | 10/1993 | WIPO . |
| WO 94/19173 | 9/1994 | WIPO . |

OTHER PUBLICATIONS

Jones, "Mechanics of Composite Materials," McGraw–Hill (1975) pp. 4–5.
Smith, et al., "Developments in Titanium Metal Matrix Composites," Journal of Metals, Mar. , 1984, pp. 19–26.
Quarterly Government Report for Sep. 1992 through Nov.
Border, et al., "Induction Heated joining of Thermoplastic Composites Without Metal Susceptors," 34th International SAMPE Symposium, May 8–11, 1989, pp. 2569–2578.
Sumida, et al., "Pan Based High Modulus Graphitized Carbon Fiber Torayca M60J", 34th International SAMPE Symposium, May 8–11, 1989, pp. 2579–2589.
J. Giachino, Welding Skills and Practices, Am. Tech. Soc., Chicago, IL (1960,1965,1967,1971,1976) 393–401.

Primary Examiner—Tu B. Hoang
Attorney, Agent, or Firm—John C. Hammer

[57] ABSTRACT

Rib and spar webs are joined in a composite wingbox to eliminate fasteners by welding the webs along bond lines defined by overlapping sections of the webs. Heat to produce the weld is generally achieved resistively by connecting a multistrip susceptor positioned along the bond line to a current source, since the geometry makes it difficult to heat these web joints inductively. The wingbox is completed without fasteners by welding skins to the rib-spar wingbox.

8 Claims, 3 Drawing Sheets

U.S. PATENT DOCUMENTS

| | | | |
|---|---|---|---|
| 2,841,678 | 7/1958 | Thorson | 219/612 |
| 2,898,435 | 8/1959 | Crafts . | |
| 2,984,732 | 5/1961 | Herbert . | |
| 3,037,105 | 5/1962 | Kohler | 219/612 |
| 3,101,403 | 8/1963 | Lewis et al. . | |
| 3,110,961 | 11/1963 | Melill et al. . | |
| 3,124,672 | 3/1964 | Sommer et al. | 219/612 |
| 3,127,674 | 4/1964 | Kohler | 228/147 |
| 3,129,459 | 4/1964 | Kullgren et al. | 425/174.8 |
| 3,183,460 | 5/1965 | Bennon . | |
| 3,288,979 | 11/1966 | Mills et al. . | |
| 3,340,101 | 9/1967 | Fields, Jr. et al. . | |
| 3,365,184 | 1/1968 | Willens | 219/602 |
| 3,395,261 | 7/1968 | Leatherman et al. . | |
| 3,395,993 | 8/1968 | Bristow | 428/633 |
| 3,431,379 | 3/1969 | Yrene . | |
| 3,444,275 | 5/1969 | Willett . | |
| 3,450,856 | 6/1969 | Buck et al. . | |
| 3,466,726 | 9/1969 | Savolainen . | |
| 3,492,453 | 1/1970 | Hurst . | |
| 3,507,735 | 4/1970 | Chisholm . | |
| 3,529,458 | 9/1970 | Butler et al. . | |
| 3,547,751 | 12/1970 | Morgan . | |
| 3,574,031 | 4/1971 | Heller et al. . | |
| 3,595,060 | 7/1971 | Hundy . | |
| 3,605,477 | 9/1971 | Carlson . | |
| 3,615,277 | 10/1971 | Kreider et al. | 428/608 |
| 3,639,974 | 2/1972 | Finnegan . | |
| 3,661,491 | 5/1972 | Troyer . | |
| 3,705,284 | 12/1972 | Binard . | |
| 3,845,268 | 10/1974 | Sindt . | |
| 3,864,186 | 2/1975 | Balla . | |
| 3,890,819 | 6/1975 | DeLuca . | |
| 3,895,436 | 7/1975 | Summers et al. . | |
| 3,900,150 | 8/1975 | Delgrosso et al. . | |
| 3,919,764 | 11/1975 | Berghezan . | |
| 3,920,175 | 11/1975 | Hamilton et al. . | |
| 3,924,793 | 12/1975 | Summers et al. . | |
| 3,927,817 | 12/1975 | Hamilton et al. . | |
| 3,934,441 | 1/1976 | Hamilton et al. . | |
| 3,941,643 | 3/1976 | Balla . | |
| 3,946,349 | 3/1976 | Haldeman, III . | |
| 3,974,673 | 8/1976 | Fosness et al. . | |
| 3,981,427 | 9/1976 | Brookers . | |
| 3,996,019 | 12/1976 | Cogan . | |
| 3,996,402 | 12/1976 | Sindt . | |
| 4,005,302 | 1/1977 | Graf et al. . | |
| 4,029,837 | 6/1977 | Leatherman . | |
| 4,029,838 | 6/1977 | Chamis et al. . | |
| 4,029,926 | 6/1977 | Austin . | |
| 4,039,794 | 8/1977 | Kasper . | |
| 4,060,364 | 11/1977 | Gras . | |
| 4,067,765 | 1/1978 | Heller, Jr. et al. . | |
| 4,091,254 | 5/1978 | Struve . | |
| 4,111,024 | 9/1978 | Dahlman et al. . | |
| 4,117,970 | 10/1978 | Hamilton et al. . | |
| 4,120,712 | 10/1978 | Sindt . | |
| 4,141,484 | 2/1979 | Hamilton et al. . | |
| 4,145,903 | 3/1979 | Leach et al. . | |
| 4,150,927 | 4/1979 | Steingroever . | |
| 4,180,717 | 12/1979 | Lenk et al. . | |
| 4,188,811 | 2/1980 | Brimm . | |
| 4,210,477 | 7/1980 | Gillespie et al. . | |
| 4,217,397 | 8/1980 | Hayase et al. . | |
| 4,233,829 | 11/1980 | Hamilton et al. . | |
| 4,233,831 | 11/1980 | Hamilton et al. . | |
| 4,263,087 | 4/1981 | Tanabe et al. . | |
| 4,263,375 | 4/1981 | Elrod . | |
| 4,269,053 | 5/1981 | Agrawal et al. . | |
| 4,288,673 | 9/1981 | Ishibashi . | |
| 4,292,375 | 9/1981 | Ko . | |
| 4,296,295 | 10/1981 | Kiuchi . | |
| 4,304,821 | 12/1981 | Hayase . | |
| 4,304,975 | 12/1981 | Lenk et al. . | |
| 4,305,449 | 12/1981 | Loszewski et al. . | |
| 4,306,436 | 12/1981 | Schulz et al. . | |
| 4,307,276 | 12/1981 | Kurata et al. . | |
| 4,313,777 | 2/1982 | Buckley et al. . | |
| 4,331,284 | 5/1982 | Schulz et al. . | |
| 4,340,650 | 7/1982 | Pattaniak et al. . | |
| 4,343,982 | 8/1982 | Schwartz et al. . | |
| 4,351,470 | 9/1982 | Swadling et al. . | |
| 4,352,280 | 10/1982 | Ghosh . | |
| 4,354,369 | 10/1982 | Hamilton . | |
| 4,355,222 | 10/1982 | Geithman et al. . | |
| 4,361,262 | 11/1982 | Israeli . | |
| 4,382,113 | 5/1983 | Schwartz et al. . | |
| 4,393,987 | 7/1983 | Anderson et al. . | |
| 4,398,659 | 8/1983 | Richter . | |
| 4,416,713 | 11/1983 | Brooks . | |
| 4,421,588 | 12/1983 | Davies . | |
| 4,426,032 | 1/1984 | Leodolter . | |
| 4,426,033 | 1/1984 | Mizuhara . | |
| 4,445,951 | 5/1984 | Lind et al. . | |
| 4,447,690 | 5/1984 | Grever . | |
| 4,454,402 | 6/1984 | Sander et al. . | |
| 4,468,549 | 8/1984 | Arnosky . | |
| 4,474,044 | 10/1984 | Leistner et al. . | |
| 4,489,123 | 12/1984 | Schijve et al. . | |
| 4,499,156 | 2/1985 | Smith et al. . | |
| 4,521,659 | 6/1985 | Buckley et al. . | |
| 4,524,037 | 6/1985 | Marc . | |
| 4,530,197 | 7/1985 | Rainville . | |
| 4,541,891 | 9/1985 | Leatherman . | |
| 4,544,339 | 10/1985 | Itoh . | |
| 4,545,272 | 10/1985 | Hubbard . | |
| 4,555,373 | 11/1985 | Bloemkolk et al. . | |
| 4,556,591 | 12/1985 | Bannink . | |
| 4,563,145 | 1/1986 | de Meij . | |
| 4,584,860 | 4/1986 | Leonard . | |
| 4,602,731 | 7/1986 | Dockus . | |
| 4,603,089 | 7/1986 | Bampton . | |
| 4,603,808 | 8/1986 | Stacher . | |
| 4,610,934 | 9/1986 | Boecker et al. . | |
| 4,621,761 | 11/1986 | Hammond et al. . | |
| 4,622,445 | 11/1986 | Matsen . | |
| 4,630,767 | 12/1986 | Mizuhara . | |
| 4,635,461 | 1/1987 | Raymond . | |
| 4,637,199 | 1/1987 | Steck et al. . | |
| 4,642,155 | 2/1987 | Ramsey . | |
| 4,649,249 | 3/1987 | Odor . | |
| 4,653,396 | 3/1987 | Wennerberg . | |
| 4,657,717 | 4/1987 | Cattanach et al. . | |
| 4,671,470 | 6/1987 | Jonas . | |
| 4,673,450 | 6/1987 | Burke . | |
| 4,684,417 | 8/1987 | Grandclement . | |
| 4,698,271 | 10/1987 | Moorhead . | |
| 4,699,849 | 10/1987 | Das . | |
| 4,706,361 | 11/1987 | Meyer et al. . | |
| 4,713,953 | 12/1987 | Yavari . | |
| 4,716,072 | 12/1987 | Kim . | |
| 4,745,245 | 5/1988 | Kitaide et al. . | |
| 4,754,114 | 6/1988 | Sommer et al. . | |
| 4,768,433 | 9/1988 | Boissevain . | |
| 4,783,228 | 11/1988 | Aker et al. | 156/64 |
| 4,791,260 | 12/1988 | Waldman . | |
| 4,797,155 | 1/1989 | Das . | |
| 4,822,972 | 4/1989 | Sugioka et al. . | |
| 4,824,617 | 4/1989 | Takeuchi et al. . | |
| 4,855,011 | 8/1989 | Legge et al. . | |
| 4,882,823 | 11/1989 | Weisert et al. . | |
| 4,888,973 | 12/1989 | Comley . | |

| | | | | | |
|---|---|---|---|---|---|
| 4,889,276 | 12/1989 | Cadwell et al. . | 5,079,817 | 1/1992 | Anstotz et al. . |
| 4,897,518 | 1/1990 | Mucha et al. . | 5,093,545 | 3/1992 | McGaffigan . |
| 4,901,552 | 2/1990 | Ginty et al. . | 5,101,086 | 3/1992 | Dion et al. . |
| 4,904,972 | 2/1990 | Mori et al. . | 5,115,963 | 5/1992 | Yasui . |
| 4,906,172 | 3/1990 | Stewart . | 5,118,026 | 6/1992 | Stacher . |
| 4,913,910 | 4/1990 | McCarville et al. . | 5,139,407 | 8/1992 | Kim et al. . |
| 4,919,759 | 4/1990 | Ilmarinen et al. . | 5,141,146 | 8/1992 | Yasui . |
| 4,934,581 | 6/1990 | Ibe et al. . | 5,199,791 | 4/1993 | Kasanami et al. . |
| 4,947,464 | 8/1990 | Mori et al. . | 5,229,562 | 7/1993 | Burnett et al. . |
| 4,951,491 | 8/1990 | Lorenz . | 5,240,542 | 8/1993 | Miller et al. . |
| 4,955,803 | 9/1990 | Miller et al. . | 5,248,864 | 9/1993 | Kodokian . |
| 4,978,825 | 12/1990 | Schmidt et al. . | 5,250,776 | 10/1993 | Pfaffmann . |
| 4,984,348 | 1/1991 | Cadwell . | 5,283,409 | 2/1994 | Brendel et al. . |
| 4,988,037 | 1/1991 | Cadwell . | 5,313,034 | 5/1994 | Grimm et al. . |
| 5,001,319 | 3/1991 | Holmstrom . | 5,313,037 | 5/1994 | Hansen et al. . |
| 5,024,369 | 6/1991 | Froes et al. . | 5,338,497 | 8/1994 | Murray et al. . |
| 5,032,327 | 7/1991 | Becheret . | 5,340,428 | 8/1994 | Kodokian . |
| 5,047,605 | 9/1991 | Ogden . | 5,410,132 | 4/1995 | Gregg et al. . |
| 5,064,978 | 11/1991 | Scholz . | 5,410,133 | 4/1995 | Matsen et al. . |
| 5,074,019 | 12/1991 | Link . | | | |

FASTENERLESS BONDER WINGBOX

REFERENCE TO RELATED APPLICATIONS

The present application is a divisional of U.S. patent application Ser. No. 08/470,168, filed Jun. 6, 1995, which was a continuation-in-part application based upon U.S. application Ser. No. 08/341,779, filed Nov. 18, 1994, now U.S. Pat. No. 5,599,472; which was a continuation-in-part application based upon U.S. patent application Ser. No. 08/169,655, filed Dec. 16, 1993, now U.S. Pat. No. 5,530,227; which was a continuation-in-part application of U.S. patent application Ser. No. 07/777,739, filed Oct. 15, 1991 (now U.S. Pat. No. 5,410,133). U.S. patent application Ser. No. 08/341,779 also was a continuation-in-part application based upon U.S. patent application Ser. No. 08/092,050, filed Jul. 15, 1993 (now U.S. Pat. No. 5,410,133; which was a divisional of U.S. patent application Ser. No. 07/681,004, filed Apr. 5, 1991, now U.S. Pat. No. 5,229,562; and finally, was a continuation-in-part application based upon U.S. patent application Ser. No. 08/151,433, filed Nov. 12, 1993 (now U.S. Pat. No. 5,420,400). We incorporate these applications and patent by reference.

TECHNICAL FIELD

The present invention relates to resistance welding of thermoplastic resin composites, especially for lap joints to connect rib and spar webs in a composite wingbox. The wingbox includes the bonded ribs and spars with web lap joints, and skins welded to the spar caps and rib caps without fasteners.

BACKGROUND ART

1. Composite Manufacturing

Fiber-reinforced organic resin matrix composites have a high strength-to-weight ratio or a high stiffness-to-weight ratio and desirable fatigue characteristics that make them increasingly popular as a replacement for metal in aerospace applications where weight, strength, or fatigue is critical. Organic resin composites, be they thermoplastics or thermosets, are expensive today. Improved manufacturing processes would reduce touch labor and forming time.

Prepregs combine continuous, woven, or chopped reinforcing fibers with an uncured, matrix resin, and usually comprise fiber sheets with a thin film of the matrix. Sheets of prepreg generally are placed (laid-up) by hand or with fiber placement machines directly upon a tool or die having a forming surface contoured to the desired shape of the completed part or are laid-up in a flat sheet which is then draped and formed over the tool or die to the contour of the tool. Then the resin in the prepreg lay up is consolidated (i.e. pressed to remove any air, gas, or vapor) and cured (i.e., chemically converted to its final form usually through chain-extension) in a vacuum bag process in an autoclave (i.e., a pressure oven) to complete the part.

The tools or dies for composite processing typically are formed to close dimensional tolerances. They are massive, must be heated along with the workpiece, and must be cooled prior to removing the completed part. The delay caused to heat and to cool the mass of the tools adds substantially to the overall time necessary to fabricate each part. These delays are especially significant when the manufacturing run is low rate where the dies need to be changed frequently, often after producing only a few parts of each kind. An autoclave has similar limitations; it is a batch operation.

In hot press forming, the prepreg is laid-up to create a preform, which is bagged (if necessary), and placed between matched metal tools that include forming surfaces to define the internal, external, or both mold lines of the completed part. The tools and composite preform are placed within a press and then the tools, press, and preform are heated.

The tooling in autoclave or hot press fabrication is a significant heat sink that consumes substantial energy. Furthermore, the tooling takes significant time to heat the composite material to its consolidation temperature and, after curing the composite, to cool to a temperature at which it is safe to remove the finished composite part.

As described in U.S. Pat. No. 4,657,717, a flat composite prepreg panel was sandwiched between two metal sheets made from a superplastically formable alloy and then formed against a die having a surface precisely contoured to the final shape of the part.

Attempts have been made to reduce composite fabrication times by actively cooling the tools after forming the composite part. These attempts have shortened the time necessary to produce a composite part, but the cycle time for and cost of heating and cooling remain significant contributors to overall fabrication costs. Designing and making tools to permit their active cooling increases their cost.

Boeing described a process for organic matrix forming and consolidation using induction heating in U.S. patent application Ser. No. 08/169,655. There, prepregs were laid up in a flat sheet and were sandwiched between aluminum susceptor facesheets. The facesheets were susceptible to heating by induction and formed a retort to enclose the prepreg preform. To ensure an inert atmosphere around the composite during curing and to permit withdrawing volatiles and outgassing from around the composite during the consolidation, we welded the facesheets around their periphery. Such welding unduly impacts the preparation time and the cost for part fabrication. It also ruined the facesheets (i.e., prohibited their reuse which added a significant cost penalty to each part fabricated with this approach). Boeing also described in U.S. patent application Ser. No. 08/341,779 a technique that readily and reliably seals facesheets of the retort without the need for welding and permits reuse of the facesheets in certain circumstances. Our "bag-and-seal" technique applies to both resin composite and metal processing.

2. Processing in an Induction Press

The dies or tooling for induction processing are ceramic because a ceramic is not susceptible to induction heating and, preferably, is a thermal insulator (i.e., a relatively poor conductor of heat). Cast ceramic tooling is strengthened and reinforced internally, with fiberglass rods or other appropriate reinforcements and externally with metal or other durable strongbacks to permit it to withstand the temperatures and pressures necessary to form, to consolidate, or otherwise to process the composite materials or metals. Cast ceramic tools cost less to fabricate than metal tools of comparable size and have less thermal mass than metal tooling, because they are unaffected by the induction field. Because the ceramic tooling is not susceptible to induction heating, it is possible to embed induction heating elements in the ceramic tooling and to heat the composite or metal retort without significantly heating the tools. The induction heating elements themselves connect to form a water cooling network. Thus, induction heating can reduce the time required and energy consumed to fabricate a part.

While graphite or boron fibers can be heated directly by induction, most organic matrix composites require a susceptor in or adjacent to the composite material preform to achieve the necessary heating for consolidation or forming. The susceptor is heated inductively and transfers its heat principally through conduction to the preform or workpiece that, in our prior work, is sealed within the susceptor retort. Enclosed in the metal retort, the workpiece does not experience the oscillating magnetic field which instead is absorbed in the retort sheets. Heating is by conduction from the retort to the workpiece.

Induction focuses heating on the retort (and workpiece) and eliminates wasteful, inefficient heat sinks. Because the ceramic tools in our induction heating workcell do not heat to as high a temperature as the metal tooling of conventional, prior art presses, problems caused by different coefficients of thermal expansion between the tools and the workpiece are reduced. Furthermore, we are energy efficient because significantly higher percentages of our input energy go to heating the workpiece than occurs with conventional presses. Our reduced thermal mass and ability to focus the heating energy permits us to change the operating temperature rapidly which improves the products we produce. Finally, our shop environment is not heated as significantly from the radiation of the large thermal mass of a conventional press, and is a safer and more pleasant environment for the press operators.

In induction heating for consolidating and/or forming organic matrix composite materials, we place a thermoplastic organic matrix composite preform of PEEK or ULTEM, for example, within a metal susceptor envelope (i.e., retort). These thermoplastics have a low concentration of residual volatile solvents and are easy to use. The susceptor facesheets of the retort are inductively heated to heat the preform. We apply consolidation and forming pressure to consolidate and, if applicable, to form the preform at its curing temperature. The sealed-susceptor sheets form a pressure zone. We evacuate the pressure zone in the retort in a manner analogous to conventional vacuum bag processes for resin consolidation, or, for low volatiles resins, like ULTEM; we can pressurize this zone to enhance consolidation. The retort is placed in an induction heating press on the forming surfaces of dies having the desired shape of the molded composite part. After the retort (and preform) are inductively heated to the desired elevated temperature, we apply differential pressure (while maintaining the vacuum in the pressure zone around the preform) across the retort which functions as a diaphragm in the press to form the preform against the die into the desired shape of the completed composite panel.

The retort often includes three susceptor sheets sealed around their periphery to define two pressure zones. The first pressure zone surrounds the composite panel/preform or metal workpiece and is evacuated and maintained under vacuum. The second pressure zone is pressurized (i.e., flooded with gas) at the appropriate time and rate to help form the composite panel or workpiece. The shared wall of the three layer sandwich that defines the two pressure zones acts as a diaphragm in this situation.

We can perform a wide range of manufacturing operations in our induction heating press. These operations have optimum operating temperatures ranging from about 350° F. (175° C.) to about 1950° F. (1066° C.). For each operation, we usually need to hold the temperature relatively constant for several minutes to several hours while we complete the operations. While we can achieve temperature control by controlling the input power fed to the induction coil, we have discovered a better and simpler way that capitalizes on the Curie temperature. By judicious selection of the metal or alloy in the retort's susceptor facesheets, we can avoid excessive heating irrespective of the input power. With improved control and improved temperature uniformity in the workpiece, we produce better products. Our method capitalizes on the Curie temperature phenomenon to control the absolute temperature of the workpiece and to obtain substantial thermal uniformity in the workpiece, by matching the Curie temperature of the susceptor to the desired temperature of the induction heating operation being performed. This temperature control method is explained in greater detail in our U.S. patent application Ser. No. 08/469,029 by Hansen et al. entitled Method for Achieving Thermal Uniformity in Induction Processing of Organic Matrix Composites or Metals, which we incorporate by reference.

3. Thermoplastic Welding

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding often requires complicated surface pretreatments.

In contrast, thermoplastic welding, which eliminates fasteners, features the ability to join thermoplastic composite components at high speeds with minimum touch labor and little, if any, pretreatments. In our experience, the welding interlayer (comprising the susceptor and surrounding thermoplastic resin either coating the susceptor or sandwiching it) also can simultaneously take the place of shims required in mechanical fastening. As such, composite welding holds promise to be an affordable joining process. For "welding" thermoplastic and thermoset composite parts together, the resin that the susceptor melts functions as a hot melt adhesive. If fully realized, the thermoplastic-thermoset bonding will further reduce the cost of composite assembly.

There is a large stake in developing a successful induction welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue permits rapid field repair of composites or other structures.

There is little or no loss of bond strength after prolonged exposure to environmental influences.

U.S. Pat. No. 4,673,450 describes a method to spot weld graphite fiber reinforced PEEK composites using a pair of electrodes After roughening the surfaces of the prefabricated PEEK composites in the region of the bond, Burke placed a PEEK adhesive ply along the bond line, applied a pressure of about 50–100 psi through the electrodes, and heated the embedded graphite fibers by applying a voltage in the range of 20–40 volts at 30–40 amps for approximately 5–10 seconds with the electrodes. Access to both sides of the assembly is required in this process which limits its application.

Prior art disclosing thermoplastic welding with induction heating is illustrated by U.S. Pat. Nos. 3,966,402 and 4,120,712. In these patents, the metallic susceptors used are of a conventional type having a regular pattern of openings of traditional manufacture. Achieving a uniform, controllable temperature in the bondline, which is crucial to preparing a thermoplastic weld of adequate integrity to permit use of welding in aerospace primary structure, is difficult with those conventional susceptors, as we discussed and illustrated in U.S. Pat. No. 5,500,511.

Thermoplastic welding is a process for forming a fusion bond between two faying thermoplastic faces of two parts. A fusion bond is created when the thermoplastic on the surface of the two thermoplastic composite parts is heated to the melting or softening point and the two surfaces are brought into contact, so that the molten thermoplastic mixes, and the surfaces are held in contact while the thermoplastic cools below the softening temperature.

Simple as the thermoplastic welding process sounds, and easy as it is to perform in the laboratory on small pieces, it becomes difficult to perform reliably and repeatably in a real factory on full-scale parts to build a large structure such as an airplane wing box. The difficulty is in getting the proper amount of heat to the bondline without overheating the entire structure, and also in achieving intimate contact of the faying surfaces of the two parts at the bondline during heating and cooling despite the normal imperfections in the flatness of composite parts, thermal expansion of the thermoplastic during heating to the softening or melting temperature, flow of the thermoplastic out of the bondline under pressure (i.e., squeeze out), and then contraction of the thermoplastic in the bondline during cooling.

The exponential decay of the strength of magnetic fields dictates that, in induction welding processes, the susceptible structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some case, destruction or denaturing of the resin. To avoid overheating of the outer plies and to insure adequate heating of the inner plies, we use a susceptor of significantly higher conductivity than the fibers to peak the heating selectively at the bondline. An electromagnetic induction coil heats a susceptor to melt and cure a thermoplastic resin (also sometimes referred to as an adhesive) to bond the elements of the assembly together.

The current density in the susceptor may be higher at the edges of the susceptor than in the center because of the nonlinearity of the coil, such as occurs when using a cup core induction coil like that described in U.S. Pat. No. 5,313,037. Overheating the edges of the assembly can result in underheating the center, either condition leading to inferior welds because of non-uniform curing. It is necessary to have an open or mesh pattern in the susceptor embedded at the bondline to allow the resin to create the fusion bond between the composite elements of the assembly when the resin heats and melts.

a. Moving coil welding processes

In U.S. Pat. No. 5,508,496, we described a tailored susceptor for approaching the desired temperature uniformity. This susceptor, designed for use with the cup coil of U.S. Pat. No. 5,313,037, relied upon carefully controlling the geometry of openings in the susceptor (both their orientation and their spacing) to distribute the heat evenly. We suggested using a regular array of anisotropic, diamond shaped openings with a ratio of the length (L) to the width (W) greater than 1 to provide a superior weld by producing a more uniform temperature than obtainable using a susceptor having a similar array, but one where the L/W ratio was one. By changing the length to width ratio (the aspect ratio) of the diamond-shaped openings in the susceptor, we achieved a large difference in the longitudinal and transverse conductivity in the susceptor, and, thereby, tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, we altered the current density in regions near the edges by increasing the foil density (i.e., the absolute amount of metal). Increasing the foil density along the edge of the susceptor increases the conductivity along the edge and reduces the current density and the edge heating. We increased foil density by folding the susceptor to form edge strips of double thickness or by compressing openings near the edge of an otherwise uniform susceptor. We found these susceptors difficult to reproduce reliably. Also, their use forced careful placement and alignment to achieve the desired effect.

The tailored susceptor was designed to use with the cup coil of U.S. Pat. No. 5,313,037, where the magnetic field is strongest near the edges because the central pole creates a null at the center. Therefore, the tailored susceptor was designed to counter the higher field at the edges by accommodating the induced current near the edges. The high longitudinal conductivity encouraged induced currents to flow longitudinally.

Our selvaged susceptor for thermoplastic welding which is described in U.S. patent application Ser. No. 08/314,027 controls the current density pattern during eddy current heating by an induction coil to provide substantially uniform heating to a composite assembly and to insure the strength and integrity of the weld in the completed part. This susceptor is particularly desirable for welding ribs between prior welded spars using an asymmetric induction coil (described in U.S. Pat. No. 5,444,220, which we incorporate by reference), because, with that coil, it provides a controllable area of intense, uniform heating, a trailing region with essentially no heating, and a leading region with minor preheating.

The power (P) [or power density] which the susceptor dissipates as heat follows the well-known equation for power loss in a resistor: $P=(J^2)(R)$ wherein J is the eddy current (or its density) and R is the impedance (i.e., resistance) of any segment of the eddy path. The heating achieved directly corresponds to the power (or power density).

We achieve better performance (i.e., more uniform heating) in rib welding by using a selvaged susceptor having edge strips without openings. The resulting susceptor, then, has a center portion with a regular pattern of opening and solid foil edges, which we refer to as selvage edge strips. We embed the susceptor in a thermoplastic resin to make a susceptor/resin tape that is easy to handle and to use in performing the composite pieces prior to welding. Also, we have discovered that, with a selvaged susceptor, the impedance of the central portion should be anisotropic with a lower transverse impedance than the longitudinal impedance. Here, the L/W ratio of diamond shaped openings should be less than or equal to one. That is, unlike our tailored susceptor of U.S. Pat. No. 5,500,511, L for the selvaged susceptor should be less than W. With this new selvaged susceptor in the region immediately under the asymmetric induction work coil, we encourage the current to flow across the susceptor to the edges where the current density is lowest and the conductivity, highest.

Generally, we form the selvaged susceptor somewhat wider than normal so that the selvage edge strips are not in the bondline. We remove the selvage edge strips after forming the weld, leaving only a perforated susceptor foil in the weld. This foil has a relatively high open area fraction.

Significant effort has been expended in developing inductor and susceptor systems to optimize the heating of the bondline in thermoplastic assemblies. Induction coil structures and tailored susceptors have now been developed that provide adequate control and uniformity of heating of the bondline, but a big hurdle remaining to perfecting the process to the point of practical utility for producing large scale aerospace-quality structures in a production environment is the aspect of the process dealing with the control of the surface contact of the faying surfaces of the two parts to be welded together, and the timing, intensity, and schedule of heat application so the material at the faying surfaces is brought to and maintained within the proper temperature range for the requisite amount of time for an adequate bond to form, and is maintained in intimate contact while the melted or softened material hardens in its bonded condition.

Large scale parts such as wing spars and ribs, and the wing skins that are bonded to the spars and ribs, are typically on the order of 20–30 feet long at present, and potentially can be hundreds of feet in length when the process is perfected for commercial transport aircraft. Parts of this magnitude are difficult to produce with perfect flatness. Instead, the typical part will have various combinations of surface deviations from perfect flatness, including large scale waviness in the direction of the major length dimension, twist about the longitudinal axis, dishing or sagging of "I" beam flanges, and small scale surface defects such as asperities and depressions. These irregularities interfere with full surface area contact between the faying surfaces of the two parts and actually result in surface contact only at a few "high points" across the intended bondline. Additional surface contact can be achieved by applying pressure to the parts to force the faying surfaces into contact, but full intimate contact is difficult or impossible to achieve in this way. Applying heat to the interface by electrically heating the susceptor in connection with pressure on the parts tends to flatten the irregularities further, but the time needed to achieve full intimate contact with the use of heat and pressure is excessive, can result in deformation of the top part, and tends to raise the overall temperature of the "I" beam flanges to the softening point, so they begin to yield or sag under the application of the pressure needed to achieve a good bond.

Our multipass thermoplastic welding process described in U.S. Pat. No. 5,486,684 enables a moving coil welding process to produce continuous or nearly continuous fusion bonds over the full area of the bondline to yield very high strength welds reliably, repeatably and with consistent quality. This process produces improved low cost, high strength composite assemblies of large scale parts fusion bonded together with consistent quality, and uses a schedule of heat application that maintains the overall temperature of the structure within the limit in which it retains its high strength, so it requires no internal tooling to support the structure against sagging which otherwise could occur above the high strength temperature limit. The process also produces nearly complete bondline area fusion on standard production composite material parts having the usual surface imperfections and deviations from perfect flatness, while eliminating fasteners and the expense of drilling holes, inspecting the holes and the fasteners, inspecting the fasteners after installation, sealing between the parts and around the fastener and the holes; reducing mismatch of materials; and eliminating arcing from the fasteners.

In the process, an induction heating work coil is passed multiple times over a bondline while applying pressure in the region of the coil to the components to be welded, and maintaining the pressure until the resin hardens. The resin at the bondline is heated to the softening or melting temperature with each pass of the induction work coil and pressure is exerted to flow the softened/melted resin in the bondline and reduce the thickness of the bondline while improving the intimacy of the faying surface contact with each pass to militate for complete continuity of bond. The total time at the softened or melted condition of the thermoplastic in the faying surfaces is sufficient to attain deep interdiffusion of the polymer chains in the materials of the two faying surfaces throughout the entire length and area of the bondline, thereby producing a bondline of improved strength and integrity in the completed part, but the total time of the faying surfaces at softened temperature is in separate time segments which allows time for the heat in the interface to dissipate without raising the temperature of the entire structure to the degree at which it loses its strength and begins to sag, so the desired shape and size of the final assembly is maintained.

A structural susceptor allows us to include fiber reinforcement within the weld resin to alleviate residual tensile strain otherwise present in an unreinforced weld. The susceptor includes alternating layers of thin film thermoplastic resin sheets and fiber reinforcement (usually woven fiberglass fiber) sandwiching the conventional metal susceptor that is embedded in the resin. While the number of total plies in this structural susceptor is usually not critical, we prefer to use at least two plies of fiber reinforcement on each side of the susceptor. This structural susceptor is described in greater detail in our U.S. patent application 08/471,625 entitled A Structural Susceptor for Thermoplastic Welding, which we incorporate by reference.

The structural susceptor permits gap filling between the welded composite laminates which tailors the thickness (number of plies) in the structural susceptor to fill the gaps, thereby eliminating costly profilometry of the faying surfaces and the inherent associated problem of resin depletion at the faying surfaces caused by machining the surfaces to have complementary contours. Standard manufacturing tolerances produce gaps as large as 0.120 inch, which is too wide to create a quality weld using the conventional susceptors.

We can easily tailor the thickness of the structural susceptor to match the measured gap by scoring through the appropriate number of plies of resin and fiber reinforcement and peeling them off. In doing so, a resin side layer will be on both faying surfaces and this layer should insure better performance from the weld.

b. Fixed coil induction welding

We have also experimented with thermoplastic welding using our induction heating workcell and, of course, discovered that the process differs from the moving coil processes because of the coil design and resulting magnetic field. We believe that our fixed coil workcell presents promise for welding at faster cycle times than the moving coil processes because we can heat multiple susceptors simultaneously. The keys to the process, however, are achieving controllable temperatures at the bondline in a reliable and reproducible process that assure quality welds of high bond strength. Our fixed coil induces currents to flow in the susceptor differently from the moving coils and covers a larger area. Nevertheless, we have developed processing parameters that permit welding with our induction heating workcell using a susceptor at the bondline. These processes are described in our U.S. Pat. No. 8,471,053 entitled Thermoplastic Welding of Organic Matrix Composites Using a Fixed Coil Induction Heater and Ser. No. 08/469,928 entitled A Reinforced Susceptor for Induction or Resistance Welding of Thermoplastic Composites.

Another advantage with the fixed coil process is that welding can occur using the same tooling and processing equipment that we use to consolidate the skin, thereby greatly reducing tooling costs. Finally, the fixed coil heats the entire bondline at one time to eliminate the need for skins that are currently used with the moving coil. We can control the temperature and protect against overheating by using our "smart" susceptors as a retort or as the bondline susceptor material or both.

Induction welding is limited, nevertheless, because there must be an appropriate oscillating magnetic field to create the eddy currents. Rib-spar web joints typically are in the wrong plane for induction with existing equipment and these joints are of short span buried within the wingbox where arranging induction heating is troublesome. Fortunately, these rib-spar web joints can be made with thermoplastic welds using a voltage source to provide current to the susceptor to obtain the necessary heating.

SUMMARY OF THE INVENTION

The present invention is a method for forming structural lap joints between a tab on the spar web and the rib web generally heating a susceptor along the bondline using a voltage source to generate currents in the susceptor. With structural lap joints we create a bonded wingbox of spars and ribs. We weld skins to the spar caps and rib caps to complete the fastenerless bonded wingbox of the present invention.

BRIEF DESCRIPTION OF THE DRAWINGS

FIG. 1 is a perspective view of a typical wingbox having resistance welded web lap joints.

FIG. 2A is a schematic plan view of a typical rib-spar web lap joint.

FIG. 2A is a schematic, magnified view of the lap joint of FIG. 2.

DETAILED DESCRIPTION OF A PREFERRED EMBODIMENT

Figures 1, 2, 2A:
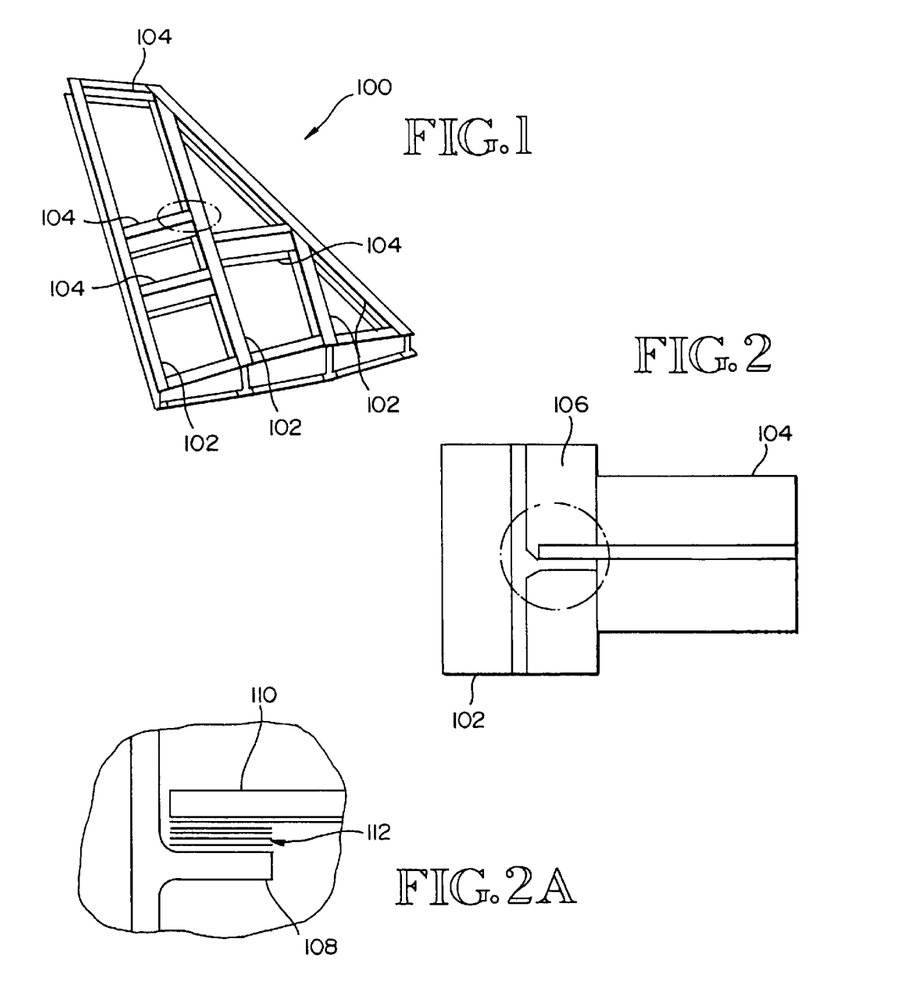

As shown in FIG. 1, a typical composite wingbox 100 designed for assembly without fasteners includes a plurality of longitudinal spars 102 with transverse ribs 104 interspersed along the run of the spars. The ribs 104 and spars 102 are joined at rib-spar web lap joints 106, which are schematically illustrated in FIG. 2. Each lap joint involves a tab 108 fabricated into the web of the spar and a tongue 110 at the end of the rib web. The cap of the rib is cut back at each joint so that the rib web can slide between the spar caps.

The overlap between the tab and tongue defines the bondline where we position a multistrip susceptor 112 to form a weld or adhesive bond between the spar and rib webs by applying a suitable voltage across the bondline. The multistrip susceptor 112 includes a metal foil of the type shown in FIG. 3. The foil includes two or more parallel strips 114 that extend the full length of the strip. The foil is usually about 0.007 in thick and each strip is about 0.10–0.20 in wide. The strips are separated by gaps of comparable width or slightly wider dimension which we etch or ablate from a solid foil. Along the length of the susceptor, we periodically use transverse spacer strips 116 to retain the carrier strips 114 apart.

Figure 3:
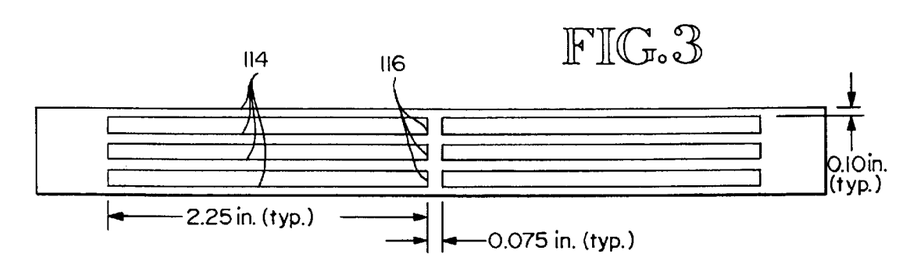
FIG. 3 is a plan view of a typical multistrip susceptor.

The foil is encased within a thermoplastic resin, and might also include fiber reinforcement either of the nature we described in U.S. patent application Ser. No. 08/471,053 entitled A Structural Susceptor for Thermoplastic Welding or U.S. patent application Ser. No. 08/466,951 entitled A Reinforced Susceptor for Induction Welding of Thermoplastic Composites, which we incorporate by reference. Fiber reinforcement alleviates residual tensile strain in the bondline. Tabs on the multistrip susceptor extend outside the bondline to allow connection with the current source. Each strip provides a low impedance longitudinal current path. The arrangement permits uniform heating in the bondline, and the resulting welds have the strength and other physical properties of our induction welds.

Other susceptor designs that produce even heating in the bondline might be used instead of the multistrip susceptor. For example, the selvaged susceptor of U.S. Pat. No. 5,508, 406 or the tailored susceptor of U.S. Pat. No. 5,500,511 adapted with suitable connection tabs might be used. We have experienced erratic performance with mesh-type susceptors, however, as the resistance weld joint length increases.

Fastening composite structure as is the conventional practice is extremely labor intensive. Drilling holes for the fasteners is tedious and time consuming. The holes weaken the load carrying capabilities of the parts by cutting the reinforcing fibers. Welding promises cost improvement, which is the primary driver for its adoption, but improved strength also presents design opportunities.

Rib-spar web lap joints 106 are good candidates for resistance welding because these vertical welds often are buried within the structure where it is difficult to create a uniform magnetic field. Resistance welds are also preferred because the welds we produce are comparable to those we create with induction at the spar cap-wingskin and rib cap-wingskin interface and are able to replace mechanical fasteners.

The rib-spar web lap joints 106 are made before the spar cap-wingskin and rib cap-wingskin welds, so these welds are accessible from the top and bottom. We reach the joints with pressure jaws to hold the spar-susceptor-rib assemblies together with 100–200 psi pressure during the welding process, and this pressure helps us to obtain a high quality bond.

Figure 4:
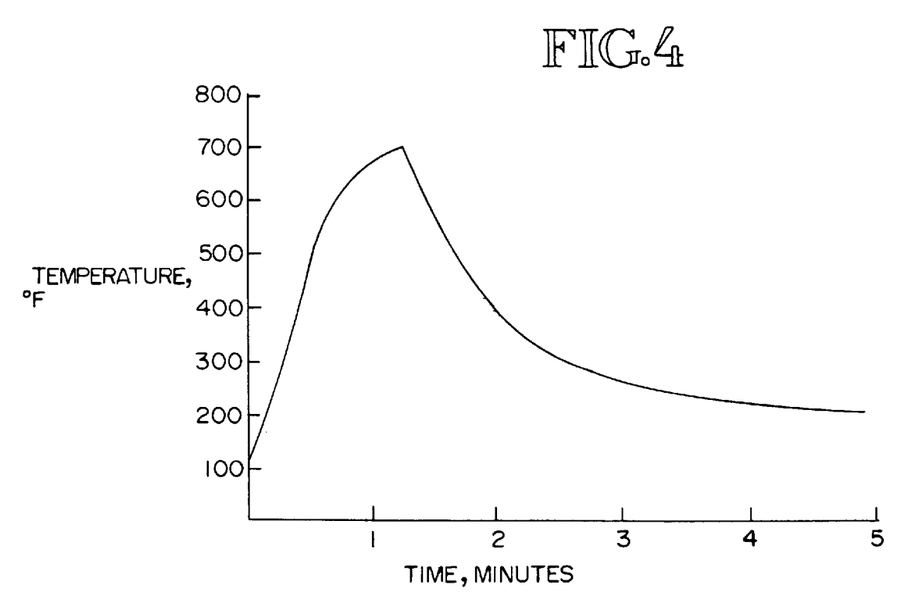
FIG. 4 is a graph showing a typical heating cycle for forming an acceptable lap joint.

A conventional arc welding power supply is a suitable current source. We apply 100 amps AC during initial warming of the bondline to about 300° F. (150° C.) and then raise the amperage to about 250 amps for the remainder of the process. We reach welding temperature in 0.5–2.0 min. at a rate of about 5°–20° F./sec (preferably, 10° F./sec) and reach a maximum temperature of about 600°–800° F. (preferably, 700° F.). Upon reaching the maximum temperature, we can hold the temperature for a short time (5–10 sec) or can immediately begin cooling the weld at a rate of about 10°–50° F./sec. Cool down, therefore, takes about 1.5–5.0 min. We hold the part in the test fixture with pressure from the jaws at least until the temperature drops below 300° F., and, preferably, below 250° F. A typical welding temperature cycle is shown in FIG. 4. The process is faster than induction welding, involves simpler tooling, and produces comparable quality welds with respect to strength.

While we generally weld between thermoplastic composites, the ribs and spars might also be green, c-stage, or fully cured thermosets. The bond in such case is an adhesive bond rather than a fusion bond.

Figure 5:
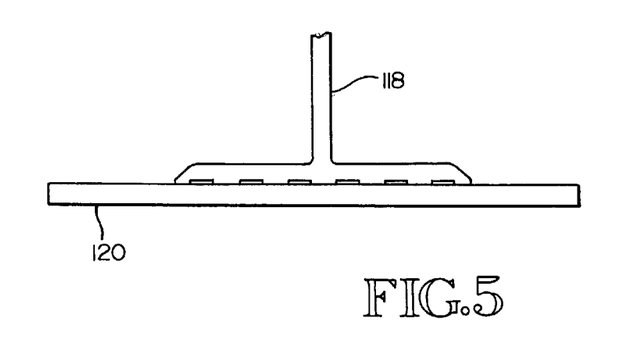
FIG. 5 is a schematic detailed sectional view of a tensile joint.
Figure 6:
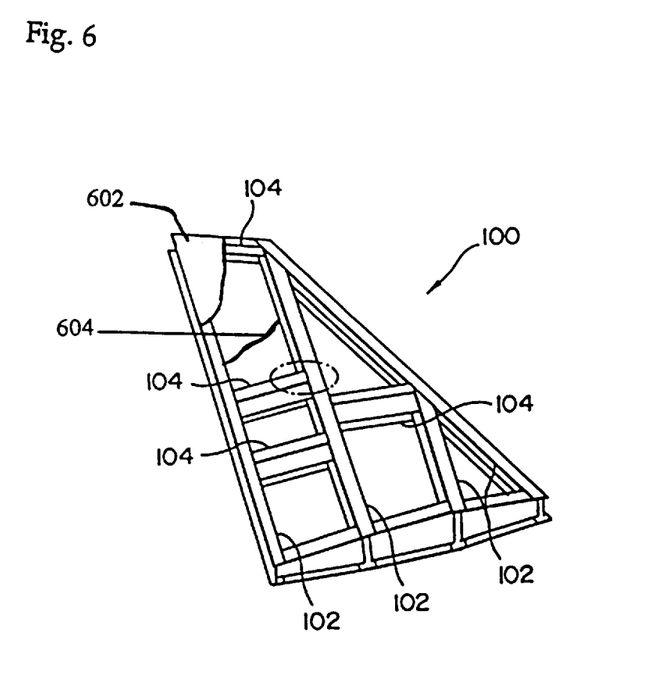
FIG. 6 is a perspective view of the wingbox, similar to FIG. 1, but having skins, partially cutaway, welded to the spars and ribs.

As an alternative to the lap joint, we can make resistance welds with tensile joints (FIG. 5) by connecting a tee 118 to a planar sheet 120. Therefore, resistance welding theoretically could be used for all the welds in the wingbox. As a practical matter, however, the resistance welds are currently limited to spars of several inches rather than distances of ten's of feet.

While we have described preferred embodiments, those skilled in the art will readily recognize alterations, variations, and modifications which might be made without departing form the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A method for making a bonded wingbox free from fasteners to connect detail parts, comprising the steps of:

(a) assembling a plurality of composite spars and composite ribs to define upper and lower surfaces for the wingbox, the spars and ribs each including a web;

(b) structurally bonding the spar web to the rib web without fasteners at each intersection between a spar and a rib while applying 100–200 psi pressure to the intersection; and (c) structurally welding a wingskin to the spars and ribs without fasteners at a bond line on at least one of the upper and lower surface.

2. A wingbox made by the method of claim 1.

3. The method of claim 1 wherein bonding includes the step of heating a susceptor between the webs at each intersection.

4. The method of claim 1 wherein welding includes the step of heating a susceptor at the bond line.

5. The method of claim 3 wherein welding includes the step of heating a susceptor at the bond line.

6. The method of claim 5 wherein heating of the susceptor occurs inductively.

7. A wingbox made by the method of claim 6.

8. The wingbox of claim 7 wherein the spars, ribs, and wingskin include a fiber-reinforced thermoplastic resin at each intersection and bond line.

* * * * *